July 29, 1969 H. N. WHITE ET AL 3,457,936
FLUID PRESSURE REGULATOR AND REFERENCE
Filed Nov. 29, 1966 2 Sheets-Sheet 1

INVENTORS
HARRY N. WHITE
JOSEPH M. KIRSHNER

BY Harry M. Saragovitz,
Edward J. Kelly, Herbert Berl
& J. D. Edgerton
ATTORNEYS

United States Patent Office 3,457,936
Patented July 29, 1969

3,457,936
FLUID PRESSURE REGULATOR AND REFERENCE
Harry N. White, Aberdeen, and Joseph M. Kirshner,
Bethesda, Md., assignors to the United States of America
as represented by the Secretary of the Army
Filed Nov. 29, 1966, Ser. No. 597,819
Int. Cl. F15c 1/00; F15b 9/06
U.S. Cl. 137—81.5                4 Claims

ABSTRACT OF THE DISCLOSURE

A fluidic pressure regulator having a closed-loop feedback fluid system which utilizes a linear and non-linear resistance arranged in parallel circuit so that fluid flow through the branches will be equal at a given reference pressure. When the pressure to be regulated varies from the reference pressure, the fluid flow through the parallel branches of resistances will not longer be equal and the difference in flow will be equal to the change in pressure. The difference in flow is converted to a difference in pressure which is integrated to maintain the error signal. The error signal is amplified and fed back to change the supply flow in a direction tending to correct the error and equalize the flow through the parallel resistance circuit.

---

This invention relates to a fluid amplification system which serves as a pressure regulator and pressure reference.

A new type of fluid control device, known as a fluid amplifier, was first developed by the Diamond Ordnance Fuze Laboratory in Washington D.C. This device made possible fluid control by the application of a fluid signal substantially smaller than the fluid flowing through the entire unit. A fluid amplifier has no moving parts except the necessary valves to supply fluid. A typical fluid amplifier may have two inlet control ports spaced in diametrically opposed relationship on either side of a main inlet port. Two output ports are provided, and the power jet from the main inlet port may be switched from one output port to the other, or divided between the two output ports in accordance with the magnitude of the control jets from the two inlet control ports. This new art, which is sometimes referred to as fluerics, has developed to the point where fluid circuits have been developed to serve as the functional counterpart of many conventional electronic circuits. The operation of the system of the present invention will be explained in terms that could apply equally as well to an electronic system.

Fluid power systems have long been utilized in industrial and other commercial applications. Many of such systems utilize only simple mechanical control devices, while some of the more sophisticated systems utilize electromechanical and electronic controls. In all of these systems the controls provided have been based upon some medium other than the fluid itself. The development of flueric devices has led to a new technology which enables the control of fluid power systems to be accomplished by devices in which the fluid itself is the working medium. The present invention is related to such devices.

It is an object of this invention to provide a fluid pressure regulator which is operable without the use of moving mechanical parts.

Another object of the invention is to provide a fluid pressure regulator which furnishes a stabilized pressure substantially unaffected by variations in the source pressure or the output loading.

In accordance with the present invention a closed-loop feedback fluid system utilizes a linear and a non-linear resistance arranged in parallel circuit so that fluid flow through the branches will be equal at a given reference pressure. When the pressure to be regulated varies from the reference pressure, the fluid flows through the parallel branches of resistances will no longer be equal and the difference in flow will be equal to the change in pressure. The difference in flow is converted to a difference in pressure which is integrated to maintain the error signal. The error signal is amplified and fed back to change the supply flow in a direction tending to correct the error and equalize the flow through the parallel resistance circuit.

The foregoing and other objects, features and advantages of the invention will be apparent from the following more particular description of a preferred embodiment of the invention, as illustrated in the accompanying drawings in which.

Figure 1:
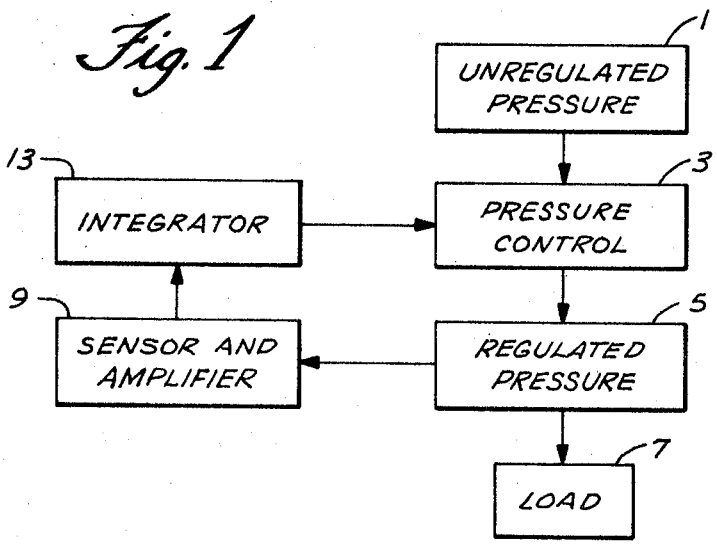
FIG. 1 is a simplified block diagram showing the overall system operation.

The operation of applicants' invention will be understood more readily by referring to the drawings in which FIG. 1 is a flow diagram showing the overall operation of the system. An unregulated pressure source 1 is utilized to supply a regulated pressure source 5 through a pressure control device 3. Load 7 is supplied directly from regulated pressure source 5. A feedback loop is provided through sensor and amplifier 9 and integrator 13. This feedback loop provides an error correcting signal which acts upon pressure control 3 to increase or decrease the supply from unregulated pressure 1 to regulated pressure 5 in accordance with the variation sensed.

Figure 2:
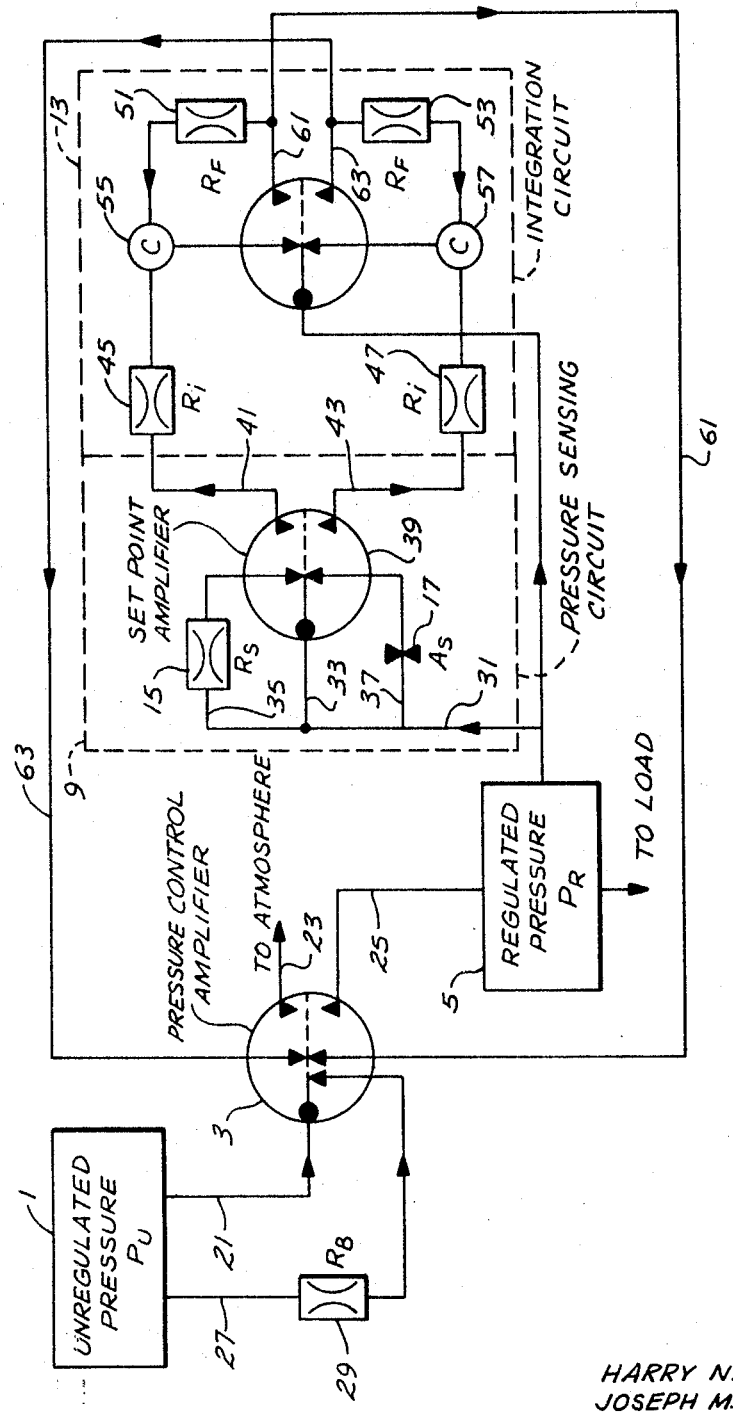
FIG. 2 is a schematic diagram of a complete system constructed in accordance with the principles of the present invention.

As illustratetd in FIG. 2, the pressure sensing circuit 9 includes a pair of resistors 15 and 17. Resistor 15 has a linear resistance characteristic and resistor 17 has an asymmetrical or non-linear resistance characteristic. An example of a fluidic element possessing linear characteristics would be a capillary tube having a length which is several times its diameter or a porous plug in a fluidic conduit. An example of a non-linear resistance would be an orifice or nozzle. A more detailed discussion of linear and non-linear resistance characteristics of fluidic elements can be found in chapter 14 of Handbook of Fluid Dynamics, by V. L. Streeter, McGraw Hill Book Company, Inc., 1961. The manner in which resistances 15 and 17 behave under varying conditions of pressure and flow may be observed from FIG. 3 of the drawings which is a graph of pressure versus flow.

The characteristics of the linear resistance is represented by a straight line, while the non-linear resistance, which is an orifice in this instance, is shown by a curved line intersecting the characteristic line of the linear resistor. The characteristics of the resistors chosen for use in the system are selected such that the intersection of their characteristic curves occur at the desired reference pressure of the system. In a parallel combination containing the linear and non-linear resistors equal volumes of flow $Q_1$ occur when the reference or null pressure is maintained throughout the system. Any increase or decrease in pressure for the reference value will produce unequal flows through the linear and non-linear resistors, and the difference in the volumes of flow is a measure of the variation of the system pressure from the desired reference value. This fact is used in the remaining circuitry to effect the desired correction in flow.

Figure 3:
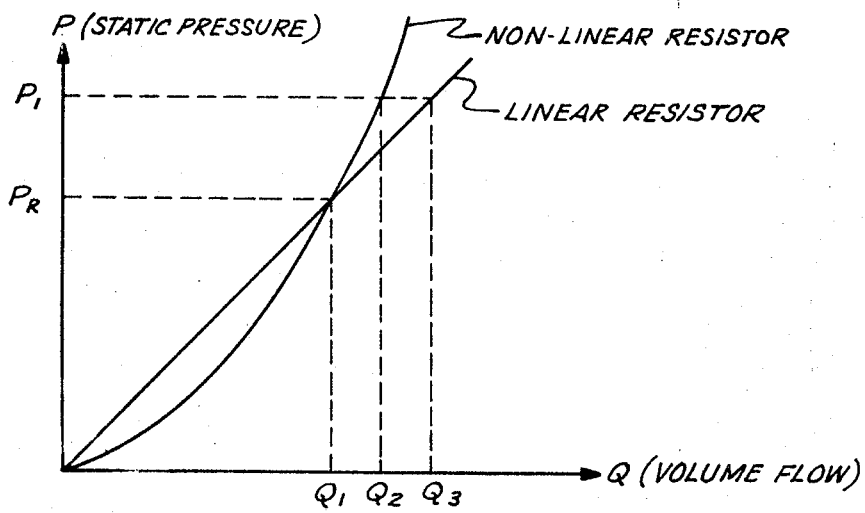
FIG. 3 is a graph of pressure versus volume showing the inherent characteristics of the linear and non-linear resistors used in the pressure sensing circuitry.

In the graph of FIG. 3 of the system pressure $P_1$ is shown to have increased from the reference pressure $P_R$ to a point where the characteristic curves do not coincide. At pressure $P_1$ a volume of fluid $Q_2$ flows through the non-linear resistance and a volume of fluid $Q_3$ flows through the linear resistance. The difference flow, defined as $Q_3-Q_2$, is proportional to the variation in system pressure from the reference pressure and may be used to derive a corrective signal. This corrective signal is amplified and integrated, and then used to control the bias of a fluid amplifier device 3 used as a pressure control amplifier.

The operation of the specific system shown in FIG. 2 of the drawings will now be described in detail. A source of unregulated pressure 1 is connected to a source of regulated pressure 5 through pressure control amplifier 3. The fluid supplied through path 21 may be diverted by pressure control amplifier 3 to exhaust to the atmosphere through path 23, thereby reducing the pressure supplied to pressure source 5, or to supply additional pressure to increase the pressure of pressure source 5 through path 25. A bias path 27 from unregulated pressure source 1 is provided through bias resistor 29 to furnish an assisting bias control on pressure control amplifier 3.

The pressure sensing circuit 9 is energized by fluid through path 31 from regulated pressure source 5. Path 31 branches into three parallel paths 33, 35 and 37 which feed the power jet and control jets of set point amplifier 39. Linear resistor 15 and non-linear resistor 17 form a parallel combination in the paths 35 and 37 feeding the control jets of set point amplifier 39. It will be appreciated from the previous description in connection with FIG. 3 of the drawing that a variation in regulated pressure source 5 from the desired reference pressure determined by the characteristic curves of resistors 15 and 17 will produce unequal volumes of flow through paths 35 and 37 to the control jets of set point amplifier 39. This action will cause the power jet fed through path 33 to be diverted either upward toward path 41, or downward toward path 43, both of which paths lead into integration circuit 13. Integration circuit 13 includes forward loop resistors 45 and 47, feedback resistors 51 and 53, and capacitors 55 and 57. The quantity to be integrated is the product of the gain of the set point amplifier 39 and the error pressure signal developed from the difference in flow through linear resistor 15 and non-linear resistor 17. The integration circuit 13, which is a boot strap integrator, feeds the output of the set point amplifier into a jet deflection amplifier through an RC circuit at each control jet. The output through paths 61 and 63 is fed back through RC circuits to the control jets in a positive sense. The output paths 61 and 63 feed the control jets of pressure control amplifier 3 to supply more fluid to regulator pressure source 5 when the pressure of source 5 has dropped below the reference pressure, and to exhaust fluid to the atmosphere when the pressure of regulated pressure source 5 has exceeded the reference pressure.

It will be appreciated from the foregoing description that applicant has provided a fluid pressure regulator having no moving parts thereby inherently possessing a long life and high degree of reliability. The regulator of the present invention can work with almost any fluid, and is unaffected by shock and wide temperature variations. Units constructed in accordance with the principle of the present invention can be mass-produced on a commercial basis at a much lower cost than comparable electromechanical or electronic units.

We wish it to be understood that we do not desire to be limited to the act details of construction shown and described, for obvious modifications will occur to the person skilled in the art.

What is claimed is:
1. A fluid pressure regulator comprising:
   a source of unregulated pressure,
   a source of regulated pressure,
   control means connecting said source of unregulated pressure and said source of regulated pressure,
   pressure sensing means connected to said source of regulated pressure, said pressure sensing means including a linear and non-linear resistance,
   integrating means connected to said pressure sensing means, and means connecting said integrating means to said control means,
   whereby any variations in pressure of said source of regulated pressure will be sensed by said pressure sensing circuit and fed back to said control means through said integrating means to compensate for such variations.

2. The combination according to claim 1 wherein said pressure sensing means comprises
   amplifier means having first and second control inputs,
   linear resistance means connected to said first control input,
   non-linear resistance means connected to said second control input and
   means connecting said linear and non-linear resistances in parallel from said source of regulated pressure,
   whereby sensing signal flow from said source of regulated pressure will be fed to said first and second control inputs of said amplifier means through said linear and non-linear resistances.

3. The combination according to claim 2 wherein said control means comprises
   a fluid pressure amplifier having first and second control jets,
   said control jets being energized by the output of said integrating means to control the flow between said source of unregulated pressure and said source of regulated pressure.

4. The combination according to claim 3 wherein said control means comprises
   bias means connected to said source of unregulated pressure to facilitate the regulating action of said control means.

References Cited
UNITED STATES PATENTS

| | | | |
|---|---|---|---|
| 3,273,377 | 9/1966 | Testerman et al. | 235—201 XR |
| 3,388,713 | 6/1968 | Bjornsen | 235—201 XR |
| 2,985,183 | 5/1961 | Peatross | 137—86 |
| 3,104,810 | 9/1963 | Lupfer | 137—86 XR |
| 3,181,547 | 5/1965 | Bennett | 137—82 |
| 3,238,959 | 3/1966 | Bowles | 137—81.5 |
| 3,292,648 | 12/1966 | Colston | 137—81.5 XR |
| 3,314,294 | 4/1967 | Colston | 137—81.5 XR |
| 3,327,725 | 6/1967 | Hatch | 137—81.5 XR |
| 3,340,885 | 9/1967 | Bauer | 137—81.5 |

SAMUEL SCOTT, Primary Examiner